United States Patent [19]
Lapeyre et al.

[11] Patent Number: 4,729,469
[45] Date of Patent: Mar. 8, 1988

[54] FLAT TOP CONVEYOR BELT

[76] Inventors: James M. Lapeyre, 13 Richmond Pl., New Orleans, La. 70150; William G. Faulkner, 608 Avenue G, Marrero, La. 70072

[21] Appl. No.: 798,481

[22] Filed: Nov. 15, 1985

[51] Int. Cl.⁴ .................. B65G 23/06; B65G 17/06
[52] U.S. Cl. ................................. 198/834; 198/853
[58] Field of Search ..................... 198/834, 851–853; 474/157, 164, 207, 232–234; 305/35 EB, 57, 58 R

[56] References Cited

U.S. PATENT DOCUMENTS

| | | | |
|---|---|---|---|
| 2,681,728 | 6/1954 | Boron | 198/851 |
| 2,852,129 | 9/1958 | Conner | 198/853 |
| 4,072,062 | 2/1978 | Morling et al. | 198/834 |
| 4,080,842 | 3/1978 | Lapeyre et al. | 198/853 |
| 4,213,527 | 7/1980 | Lapeyre et al. | 198/853 |
| 4,283,184 | 8/1981 | Berg | 198/834 |
| 4,556,142 | 12/1985 | Lapeyre | 198/853 |
| 4,678,244 | 7/1987 | Furuta et al. | 305/57 |
| 4,688,670 | 8/1987 | Lapeyre | 198/853 |

FOREIGN PATENT DOCUMENTS 1334887  7/1963  France ................ 198/853

OTHER PUBLICATIONS

*Engineering Design Data,* Booklet by Intralox, 1982, p. 5.

Primary Examiner—Joseph E. Valenza
Attorney, Agent, or Firm—Weingarten, Schurgin, Gagnebin & Hayes

[57] ABSTRACT

A conveyor belt is composed of plurality of substantially identical interlinked modules each of which is of integral plastic molded construction. Each module includes a body of plate-like planar configuration and first and second link ends outwardly extending from respective opposite edges of the body, the link ends being mateable with corresponding link ends of adjacent modules. The upper surface of the body and contiguous surfaces of the link ends define a flat conveying surface such that a conveyor belt composed of assembled modules provides an effectively continuous flat top conveyor for carriage of products. Each module includes an array of sprocket teeth across the width of the module and midway between the link ends, which are arranged in operative pairs coacting with corresponding portions of a sprocket wheel for positive belt drive.

15 Claims, 10 Drawing Figures

FLAT TOP CONVEYOR BELT

FIELD OF THE INVENTION

This invention relates to conveyor belts and more particularly to modular integrally molded plastic conveyor belts and modules therefor.

BACKGROUND OF THE INVENTION

A variety of integrally molded plastic conveyor belts are known, exemplary ones being the subject of U.S. Pat. Nos. 3,870,141 and 4,051,949 of the present inventor. Other integrally molded conveyor belts include belts such as those disclosed in applicant's patent applications having Ser. Nos. 421,057, 724,501 and 179,523, filed Apr. 22, 1982, Apr. 18, 1985 and Apr. 19, 1980, respectively.

The belts are composed of linked modules which are of open construction comprising a plurality of parallel link elements joined and maintained in spaced relation by one or more cross members. For some purposes, it is desirable to have a conveyor belt formed of modules having a continuous flat top surface and of substantially unobstructed configuration.

SUMMARY OF THE INVENTION

The present invention provides a conveyor belt having an effectively continuous flat top conveying surface and composed of interlinked modules each of substantially identical integral construction. Each module comprises a body of plate-like planar configuration and an array of link ends outwardly extending from respective opposite edges of the body, the link ends being laterally offset to mate with corresponding link ends of adjacent modules. A surface of the body and contiguous surfaces of the link ends define a flat conveying surface, which in an assembled belt is contiguous with mated modules to provide an effectively continuous flat top conveyor. Each module also includes an array of sprocket teeth disposed across the width of the module and midway between the link ends for driving of the belt in a manner which minimizes scrubbing between the sprocket drive surface and chordal action of the belt. The sprocket teeth are arranged in operative pairs, except in the illustrated embodiment for the outermost teeth adjacent to the side edges, and which coact with corresponding portions of a sprocket wheel for positive drive of the belt. The link ends at the side edges of the module can include an opening therein in which a pivot rod can be headed or otherwise terminated inboard of the side edges to prevent protrusion of any rod ends beyond the side edges of the belt. The belt is of substantially unobstructed form for ease of cleaning of the module surfaces.

DESCRIPTION OF THE DRAWINGS

The invention will be more fully understood from the following detailed description taken in conjunction with the accompanying drawings, in which.

DETAILED DESCRIPTION OF THE INVENTION

Figure 1:
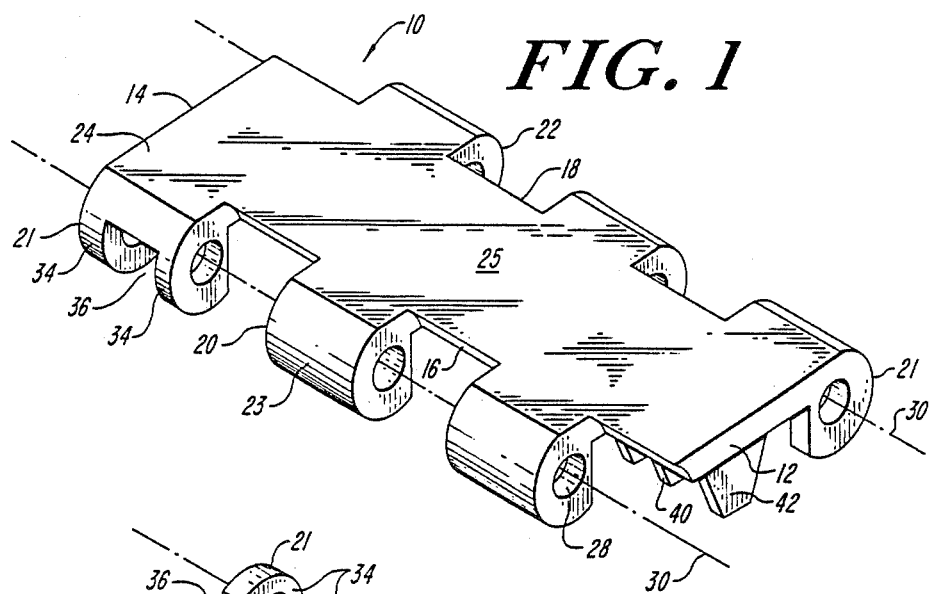
FIG. 1 is a pictorial view of a conveyor module in accordance with the invention.
Figure 2:
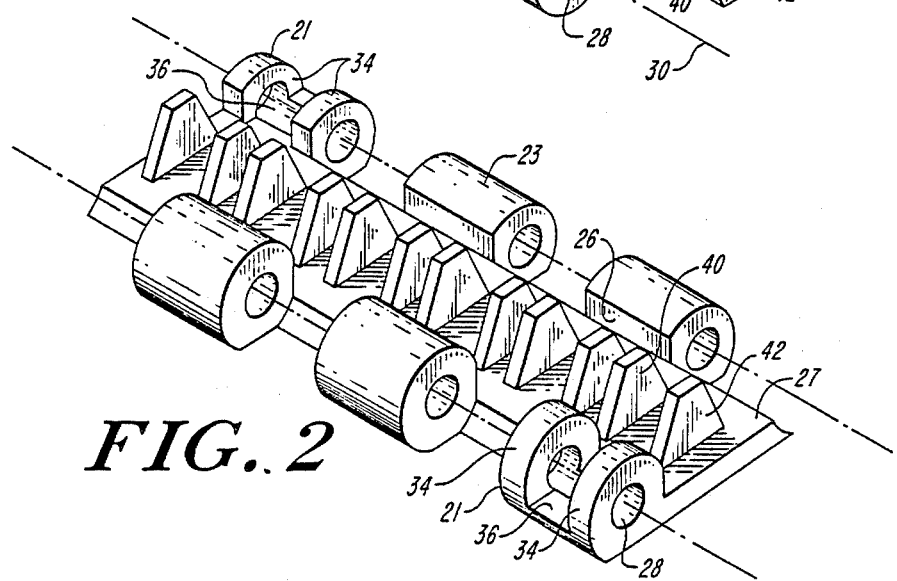
FIG. 2 is a bottom pictorial view of the module of FIG. 1.
Figure 4:
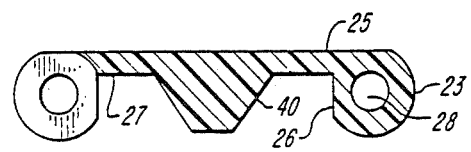
FIG. 4 is a cutaway sectional view of the module of FIGS. 1-3.
Figure 5:
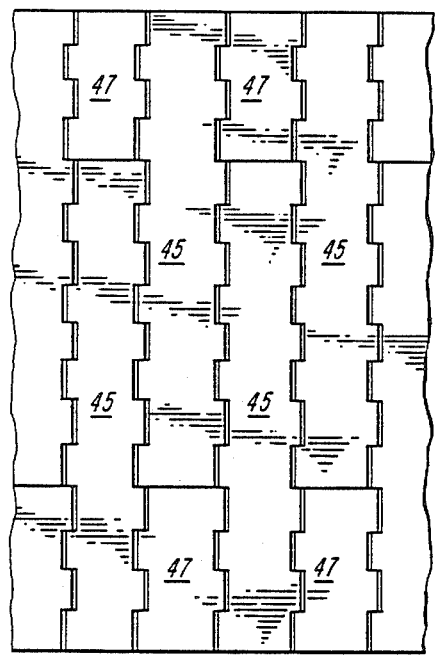
FIG. 5 is a cutaway plan view of interconnected modules.

A flat top conveyor module constructed and operative in accordance with the invention is shown in FIGS. 1-5 of the drawing. The module comprises a rectangular body 10 of plate-like configuration and having side edges 12 and 14 and front and rear edges 16 and 18. A plurality of spaced link ends 20 extend from edge 16, and a plurality of spaced link ends 22 extend from edge 18, and are laterally offset from ends 20. The link ends are each of a width slightly less than the spacing between laterally adjacent ends such that the ends of adjacent modules can be intermeshed for pivotal engagement. As will be appreciated, pivotally connecting both pluralities of link ends with link ends of other modules allows the fabrication of a conveyor belt of any desired length. The link ends have partially cylindrical portions 23 and have upper surfaces 24 coplanar with the upper or conveying surface 25 of the body. The link ends each have a back side 26 which joins the bottom surface 27 of the body and is formed so as to provide clearance for an associated sprocket wheel. In the preferred embodiment, an opening 28 is provided through each of the link ends 20 and 22, the openings of each array of link ends lying on a common pivot axis 30 and being aligned to receive a pivot rod 32 through the mated or intermeshed ends of linked modules. However, it will be appreciated that other means for pivotally connecting intermeshed modules along the pivot axis 30 may be employed. The edges 16 and 18 of the body 10 between the link ends are radiused as best seen in FIG. 2 to closely confront the cylindrical surface 23 of the mated link ends of a linked module, thereby providing a minimum gap between linked modules and a substantially continuous conveying surface as illustrated in FIG. 5. The link ends 20 and 22 are of complementary disposition such that either end of a module is mateable with an adjacent module of given orientation.

Figure 3:
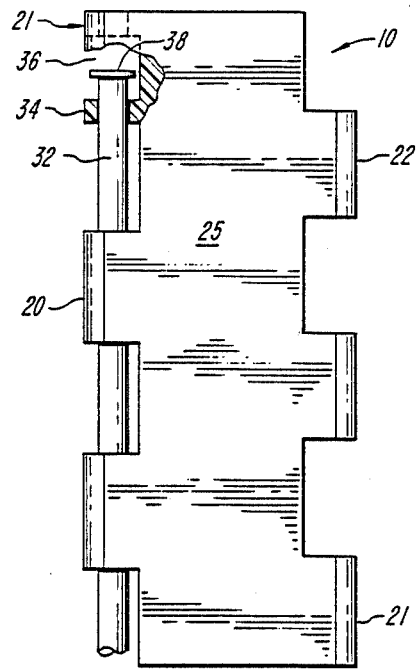
FIG. 3 is a top view of the module of FIGS. 1 and 2.

The outer link ends 21 at the diagonally opposite sides of the module include outer and inner collar portions 34 and an open intermediate area 36. The pivot rod can terminate within this open area such as by providing a headed end 38, as shown in FIG. 3, so that the rod ends are inboard of the side edges of mated modules and do not protrude beyond the edges of the linked modules. For applications in which the pivot rod 32 can extend beyond the side edges of the module, the rod can be terminated at the side edge, and the outer link ends may be of the same solid form as the other link ends of the module.

An array of sprocket teeth 40 are disposed on the bottom surface across the width of the body 10 midway between the link ends 20 and 22. These sprocket teeth are of truncated triangular configuration and are centered along an axis midway between the pivot axes 30 of the module and parallel thereto. The sprocket teeth 40 are of substantially the same thickness as that of the rectangular body of the module for purposes of molding efficiency and the provision of a uniform molded structure which will exhibit consistent thermal expansion properties during molding of the module and over an operating range of temperatures. The sprocket teeth 40 are arranged in pairs across the width of the module, the teeth pairs being cooperative with a sprocket wheel, to be described, which provides positive driving engagement of a conveyor belt composed of the modules. In the illustrated embodiment, the outermost teeth 44 of the module adjacent to respective side edges exist singly rather than in pairs. The sprocket teeth 40 are arranged in pairs, except for the outermost teeth 42 adjacent to respective side edges, the teeth being cooperative with a sprocket wheel, to be described.

The modules are integrally molded of a suitable plastic material such as but not limited to polypropylene, polyethylene, acetal and the like, and are preferably fabricated in standard 2", 3" and 6" widths which can be interconnected to provide a belt of substantially any intended overall width. A row of modules of at least two different widths such as modules 45 and 47 can be interconnected with an adjacent row of pivotally connected modules in brick laid fashion as shown in FIG. 5, such that laterally adjacent modules are straddled by a connected module to provide improved lateral strength and rigidity to the belt.

Figure 6:
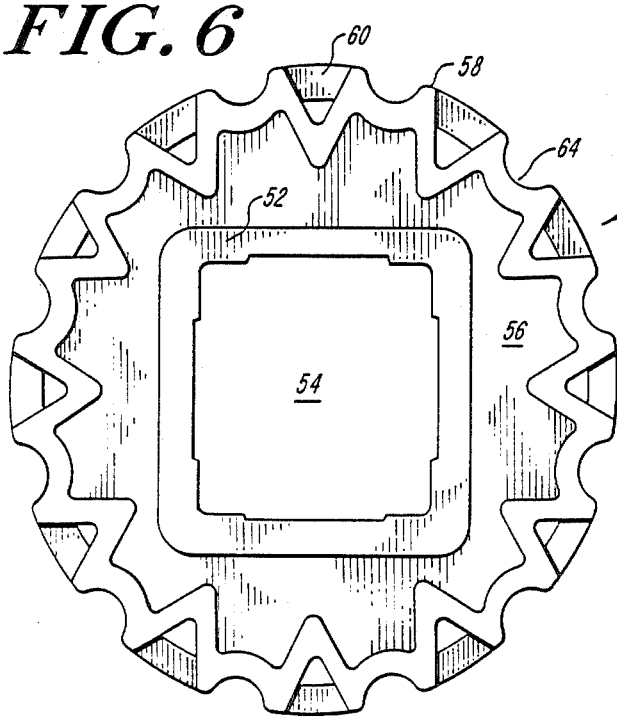
FIG. 6 is an elevation view of a sprocket wheel employed in the invention.
Figure 7:
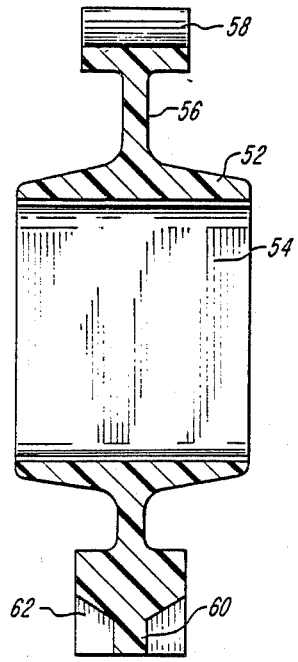
FIG. 7 is a sectional elevation view of the sprocket of FIG. 6.

The sprocket wheel for driving a conveyor belt composed of the modules described above is shown in FIGS. 6-8, and is also of plastic integrally molded construction.

Figure 8:
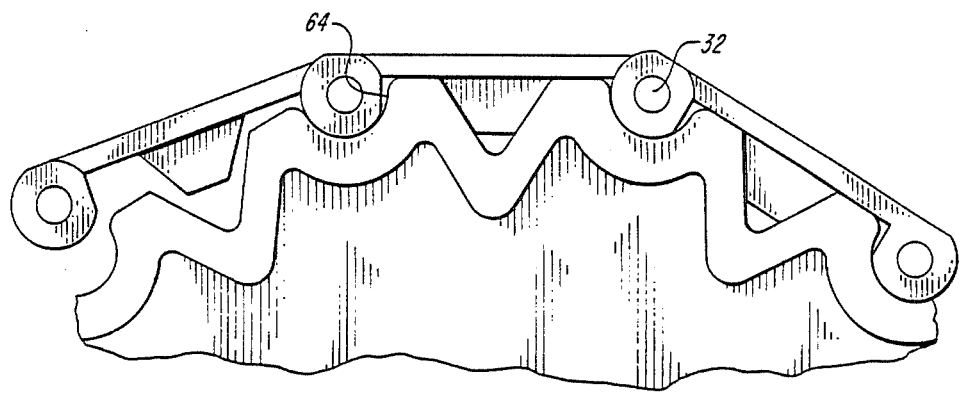
FIG. 8 is a cutaway elevation view illustrating the sprocket wheel in driving engagement with a conveyor belt constructed in accordance with the invention.
Figure 9:
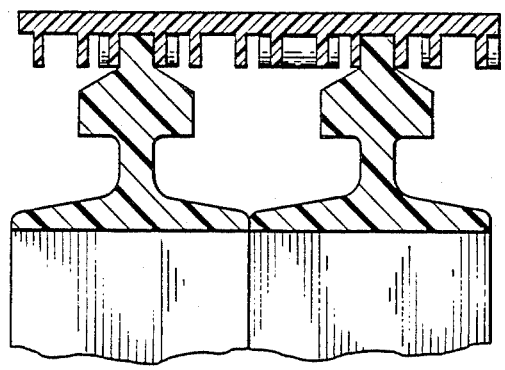
FIG. 9 is a sectional elevation view of an alternative conveyor belt module.

The sprocket wheel for driving a conveyor belt composed of the modules described above is shown in FIGS. 6-8, and is also of plastic integrally molded construction. The sprocket wheel 50 includes a hub 52 and in the illustrated embodiment having a generally square opening 54 therethrough, a web portion 56 surrounding the hub, and a peripheral portion 58 which includes a central flange 60 and recesses 62 on opposite sides of the flange. The recesses 62 and intermediate flange 60 are cooperative with the pairs of sprocket teeth 40 of the modules and are in driving engagement with the sprocket teeth. Semicircular recesses 64 are provided between the sprocket recesses 62 to accommodate the link ends of the belt, as shown in FIG. 8. Typically, two or more sprocket wheels are employed across the width of the conveyor belt, as seen in FIG. 9, for driving the belt along an intended path.

In the presently preferred implementation, the module has a one inch pitch between its pivot axes, and is constructed in module widths of 2", 3" and 6". The sprocket wheels are typically constructed in twelve tooth and twenty tooth versions.

Figure 10:
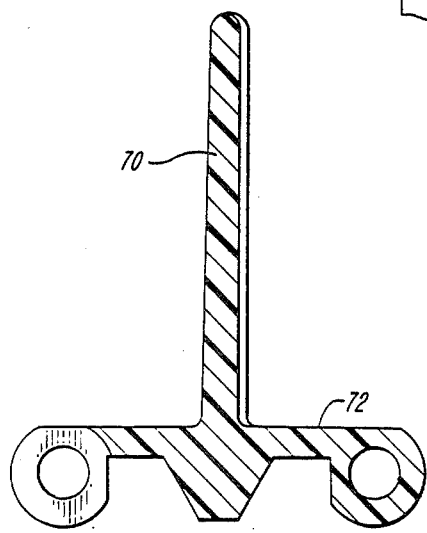
FIG. 10 is a sectional elevation view of an alternative conveyor belt module.

An alternative conveyor belt module is shown in FIG. 10 and includes a flight 70 outwardly extending substantially orthogonal to the flat top conveying surface 72. The flight is integrally molded with the module body and is of plate-like configuration, and is useful to support some types of products or, when the belt travels along an inclined path, to support a product. It will be understood, of course, that a typical application may require several rows of regular modules as shown in FIG. 1, followed by a single row of modules with flights as shown in FIG. 10, which single row is in turn again followed by several rows of regular modules.

The invention is not to be limited by what has been particularly shown and described, except as indicated in the appended claims.

What is claimed is:

1. A conveyor module comprising:
   a body of plate-like configuration having said edges and front and rear edges, a flat bottom surface and a flat conveying surface;
   a first plurality of spaced link ends extending from the front edge;
   a second plurality of spaced link ends extending from the rear edge and laterally offset from the first plurality of spaced link ends;
   each link end having a surface substantially coplanar with the conveying surface of the body, and a partially cylindrical portion extending along a pivot axis;
   each plurality of link ends being spaced to mate with link ends of adjacent like modules such that adjacent modules may be pivotally connected along said pivot axis;
   a plurality of sprocket engaging teeth extending from the bottom surface and spaced side by side across the width of the module each midway between the pivot axes of the first and second pluralities of link ends, at least some of the sprocket teeth arranged in plural pairs in such a way that both of the teeth of each of such pairs are cooperative with corresponding portions of an associated sprocket wheel to simultaneously engage said corresponding portions as the sprocket wheel rotates.

2. The invention of claim 1 wherein the front and rear edges of the body are radiused to closely confront the cylindrical portion of the mated link ends of a linked module.

3. The invention of claim 1 wherein the link ends each include a back side joining said bottom to the surface containing the sprocket teeth and providing clearance for an associated sprocket wheel.

4. The invention of claim 1 wherein outer ones of the link ends include inner and outer collar portions and an open intermediate area, the open intermediate area being operative to accommodate the end of a pivot rod.

5. The invention of claim 4 wherein the outer link ends are at diagonally opposite sides of the module body.

6. The invention of claim 1 wherein the sprocket teeth are each of truncated triangular configuration.

7. The invention of claim 1 further including a flight outwardly extending from the conveying surface of the body.

8. The invention of claim 1 wherein the module is of integral plastic molded construction.

9. The conveyor module of claim 1 wherein each plurality of link ends define aligned openings for accommodating a pivot rod therethrough.

10. A conveyor belt assembly comprising:
    a multiplicity of conveyor modules, each module comprising:
    a body of plate-like configuration having side edges and front and rear edges, a bottom surface and a flat conveying surface;
    a first plurality of spaced link ends extending from the front edge;
    a second plurality of spaced link ends extending from the rear edge and laterally offset from the first plurality of spaced link ends;

each plurality of link ends being spaced to mate with link ends of another one of said multiplicity of modules such that adjacent modules may be pivotally connected along said pivot axis;

a plurality of sprocket engaging teeth extending from the bottom surface of the body and spaced side by side across the width of the module each midway between the pivot axes of the first and second pluralities of link ends, at least some of the sprocket teeth arranged in plural pairs in such a way that both of the teeth of each of such pairs are cooperative with corresponding portions of an associated sprocket wheel to simultaneously engage said corresponding portions as the sprocket wheel rotates;

a plurality of means for pivotally connecting at least two intermeshed ones of said multiplicity of modules along said pivot axis thereby forming a conveyor belt of pivotally connected modules; and a sprocket wheel including a hub having a selected shaped opening through which a correspondingly shaped shaft can be disposed, a peripheral rim defining a plurality of recesses for cooperating with said pairs of sprocket teeth on said modules and in driving engagement therewith.

11. The conveyor belt of claim 10 wherein each plurality of link ends defines aligned openings, and said plurality of means for pivotally connecting comprises a pivot rod extending through said aligned openings of two intermeshed modules.

12. The conveyor belt assembly of claim 10 wherein said multiplicity of modules includes a first group of said multiplicity of a first selected length and a second group of a different selected length, each row of pivotally connected modules including at least one modules from each of said first and second groups, said modules of each row arranged in brick-laid fashion with an adjacent row.

13. The conveyor belt assembly of claim 10 wherein said selected shaped opening through said hub is non-circular.

14. The invention of claim 10 wherein the sprocket wheel is of integral plastic molded construction.

15. The conveyor belt assembly of claim 10 wherein said peripheral rim of said sprocket includes a central flange and a pair of recesses on each side of said flange receive a pair of said cooperating sprocket teeth.

* * * * *

UNITED STATES PATENT AND TRADEMARK OFFICE
CERTIFICATE OF CORRECTION

PATENT NO. : 4,729,469

DATED : March 8, 1988

INVENTOR(S) : James M. Lapeyre and William G. Faulkner

It is certified that error appears in the above-identified patent and that said Letters Patent is hereby corrected as shown below:

Column 4, line 6, "said edges" should read --side edges--

Column 6, line 12, "one modules" should read --one module--

Signed and Sealed this

Ninth Day of May, 1989

Attest:

DONALD J. QUIGG

Attesting Officer

Commissioner of Patents and Trademarks